(12) United States Patent
Saadoun

(10) Patent No.: US 9,781,987 B2
(45) Date of Patent: Oct. 10, 2017

(54) HEATING BAG FOR BAKERY PRODUCTS

(75) Inventor: Serge Saadoun, Soissons (FR)

(73) Assignee: Serge Saadoun, Soissons (FR)

( * ) Notice: Subject to any disclaimer, the term of this patent is extended or adjusted under 35 U.S.C. 154(b) by 2190 days.

(21) Appl. No.: 10/578,500

(22) PCT Filed: Nov. 6, 2003

(86) PCT No.: PCT/FR03/03320
§ 371 (c)(1),
(2), (4) Date: Jan. 23, 2007

(87) PCT Pub. No.: WO2005/055664
PCT Pub. Date: Jun. 16, 2005

(65) Prior Publication Data
US 2007/0164014 A1    Jul. 19, 2007

(51) Int. Cl.
| | | |
|---|---|---|
| *A21B 1/52* | (2006.01) | |
| *H05B 3/34* | (2006.01) | |
| *A45C 15/00* | (2006.01) | |
| *A47J 47/14* | (2006.01) | |
| *A45C 3/04* | (2006.01) | |
| *A47J 36/24* | (2006.01) | |

(52) U.S. Cl.
CPC .............. *A45C 15/00* (2013.01); *A47J 47/145* (2013.01); *H05B 3/34* (2013.01); *A45C 3/04* (2013.01); *A47J 36/2483* (2013.01); *H05B 2203/003* (2013.01); *H05B 2203/014* (2013.01); *H05B 2203/017* (2013.01); *H05B 2203/028* (2013.01); *H05B 2203/033* (2013.01)

(58) Field of Classification Search
CPC ........ A45C 15/00; A45C 3/04; A47J 36/2483; A47J 47/145; H05B 2203/003; H05B 2203/014; H05B 2203/017; H05B 2203/028; H05B 2203/033; H05B 3/34
USPC ........ 219/385–387, 523, 528–230, 544, 549, 219/521; 383/84, 86, 97, 99, 22–25, 29; 206/545, 459.1, 459.5, 548, 549; 99/483
See application file for complete search history.

(56) References Cited

U.S. PATENT DOCUMENTS

| | | | | |
|---|---|---|---|---|
| 2,021,458 | A | * | 11/1935 | Barnett ......................... 219/529 |
| 4,260,061 | A | * | 4/1981 | Jacobs .......................... 383/203 |
| 4,806,736 | A | * | 2/1989 | Schirico ........................ 219/386 |
| 4,816,646 | A | | 3/1989 | Solomon et al. |
| 4,916,290 | A | | 4/1990 | Hawkins |
| 6,018,143 | A | | 1/2000 | Check |
| 6,281,477 | B1 | * | 8/2001 | Forrester et al. ............. 219/387 |
| 6,519,835 | B1 | * | 2/2003 | Von Arx et al. ................ 29/611 |
| 6,555,789 | B2 | | 4/2003 | Owens et al. |

(Continued)

FOREIGN PATENT DOCUMENTS

FR    2791126 A1    9/2000

*Primary Examiner* — Sang Y Paik
(74) *Attorney, Agent, or Firm* — Bainwoodhuang

(57) ABSTRACT

The heater bag for bakery products comprises a flexible or semi-rigid casing defining a bottom (111), side walls (110), an opening (112), and means (113) for selectively closing the opening (112). At least one semi-flexible heater plate (121, 122) having an electrical heater element (141, 142) incorporated therein is itself inserted in a pocket of natural material comprising cotton, flax, and wool, said pocket constituting a portion of the flexible or semi-rigid casing of the bag. For each heater plate (121, 122), the heating power per cm² lies in the range 0.13 W to 0.24 W.

10 Claims, 4 Drawing Sheets

(56) References Cited

U.S. PATENT DOCUMENTS

| | | | |
|---|---|---|---|
| 6,563,094 B2 * | 5/2003 | Kochman et al. | 219/549 |
| 2002/0038800 A1 | 4/2002 | Laken et al. | |
| 2006/0213895 A1 * | 9/2006 | Dennis | 219/211 |

* cited by examiner

HEATING BAG FOR BAKERY PRODUCTS

This is a 371 national phase application of PCT/FR2003/003320 filed 6 Nov. 2003, the content of which is incorporated herein by reference.

The present invention relates to a heater bag for bakery products made from a flour-based dough, the heater bag comprising a flexible or semi-rigid casing defining a bottom, side walls, an opening, and means for selectively closing the opening.

Various types of heater packaging are already known, in particular for foodstuffs, that comprises an enclosure fitted with electrical heater means. Nevertheless, such devices are generally implemented in the form of rigid boxes of relatively high cost and non-negligible weight, even if they are designed to be portable.

Also known, e.g. from British patent No. 2 127 678A, are heater bags for foodstuffs, said bags comprising an outer casing of plastics material associated with an aluminum sheet and with an inner lining that includes electrical heater elements placed facing the aluminum sheet, the electrical heater elements being powered from a low voltage power supply, e.g. available from the cigar lighter of a motor vehicle. That type of heater bag is unsuitable for warming particular kinds of food, such as bakery products, where it is essential to control the evaporation of water in specific manner in order to avoid the bread or the bakery article in question, e.g. a bun, becoming stale.

The present invention seeks to remedy the above-mentioned drawbacks and to enable a heater bag to be made that is lightweight, inexpensive, easily transported, and suitable for use in complete safety for quickly warming bakery products, such as leavened or unleavened bread, e.g. French bread, rye bread, whole wheat bread, bran bread, batch bread, breads known by the names pita, motsi, mezonot, halot, lavash, pretzels, matsot, Italian breads, tabounas, or paninos, or pastries such as, for example pains au lait, buns, or croissants, while fully conserving the quality and the integrity of these products and simultaneously improving their flavor.

In accordance with the invention, these objects are achieved by a heater bag for bakery products made using a flour-based dough, the bag comprising a flexible or semi-rigid casing defining a bottom, side walls, an opening, and means for selectively closing the opening, the bag being characterized in that it includes at least one semi-flexible heater plate having an electrical heater element incorporated therein, and itself being inserted in a pocket of natural material comprising cotton, flax, and wool, said pocket constituting a portion of the bottom, of the side walls, or of the means for closing the bag, and in that for each heater plate the heating power per square centimeter (cm$^2$) lies in the range 0.13 watts (W) to 0.24 W.

Preferably, the heating power per cm$^2$ for each heater plate lies in the range 0.16 W to 0.20 W, and more preferably is close to 0.18 W.

Advantageously, the heater bag includes first and second semi-flexible heater plates each having a heater element incorporated therein and themselves being inserted in pockets of natural material constituting a portion of the bottom, of the side walls, or of the means for closing the bag.

The power supply voltage for the heater element of each heater plate lies in the range 100 volts (V) to 240 V.

In a first possible embodiment, the first and second heater plates are incorporated in two opposite portions of the side walls.

In another possible embodiment, the first and second heater plates are incorporated firstly in the bottom of the bag and secondly in the means for selectively closing the opening.

In an advantageous embodiment, each semi-flexible heater plate comprises an electrical resistance wire integrated in a sheet that is inserted in sheets of silicone glass fabric.

In a particular aspect of the invention, each pocket incorporating a semi-flexible heater plate comprises firstly an outer cotton lining and a flannelette disposed between the outer cotton lining and said heater plate, and secondly an inner cotton lining placed on the inside relative to said heater plate.

For use more particularly adapted to loaves of elongate shape such as French bread, the heater bag may be elongate in shape and the means for selectively closing the opening are constituted by a simple flexible flap or by closure means disposed in the vicinity of the rim of the opening.

For use more particularly adapted to loaves or buns of small size or of round, flat, or ring shape, the heater bag may present the form of a case and may include semi-rigid walls reinforced by a layer of a heat-reactivatable substance used for tiebacks.

According to a particular characteristic, that makes the heater bag more universal, the heater bag includes a switch for selectively connecting the heater elements in series for powering from a power supply at a first nominal voltage $V_{N1}$, or in parallel for powering from a power supply at a second nominal voltage $V_{N2}$ equal to half the first nominal voltage $V_{N1}$.

The heater bag may also include a temperature limiter integrated in each heater plate.

In a particular embodiment, the heater bag includes a pair of semi-flexible heater plates disposed in two opposite main faces of the bag, and the walls uniting these opposite main faces present a capacity for deformation in a direction perpendicular to said opposite main faces.

Each semi-flexible heater plate may be removable relative to the pocket in which it is inserted.

Other characteristics and advantages of the invention appear from the following description of particular embodiments, given as examples, with reference to the accompanying drawings, in which.

Figure 1:
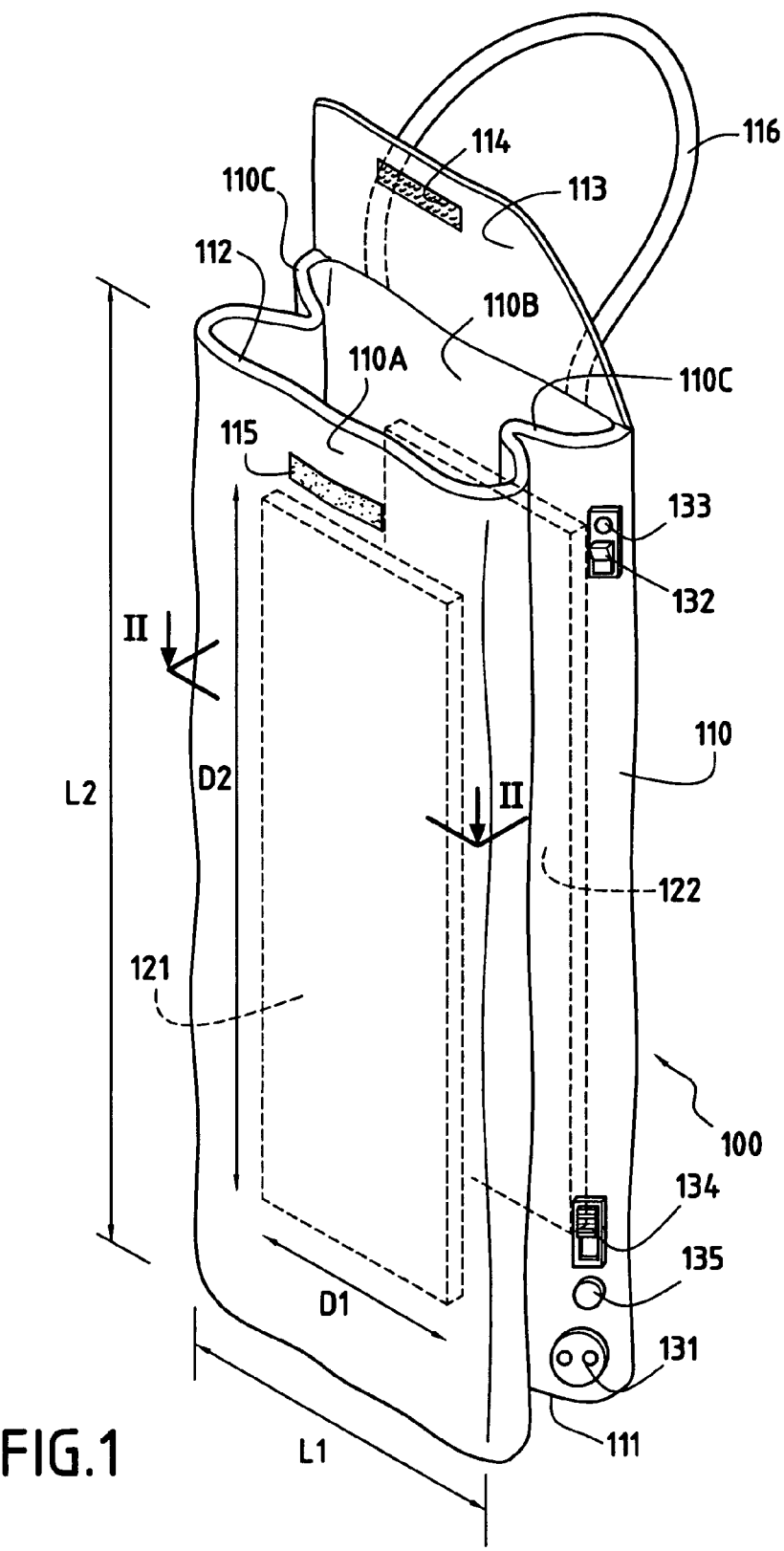
FIG. 1 is an overall perspective view of a first embodiment of a heater bag of the invention, adapted for long loaves.
Figure 2:
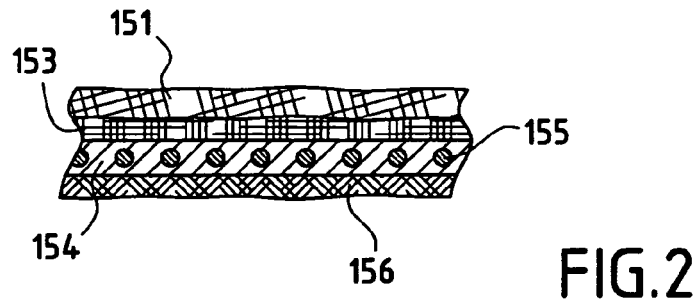
FIG. 2 is a section on line II-II of FIG. 1 showing the structure of a portion of the side wall of the bag incorporating a semi-rigid electrical heater plate.
Figure 3:
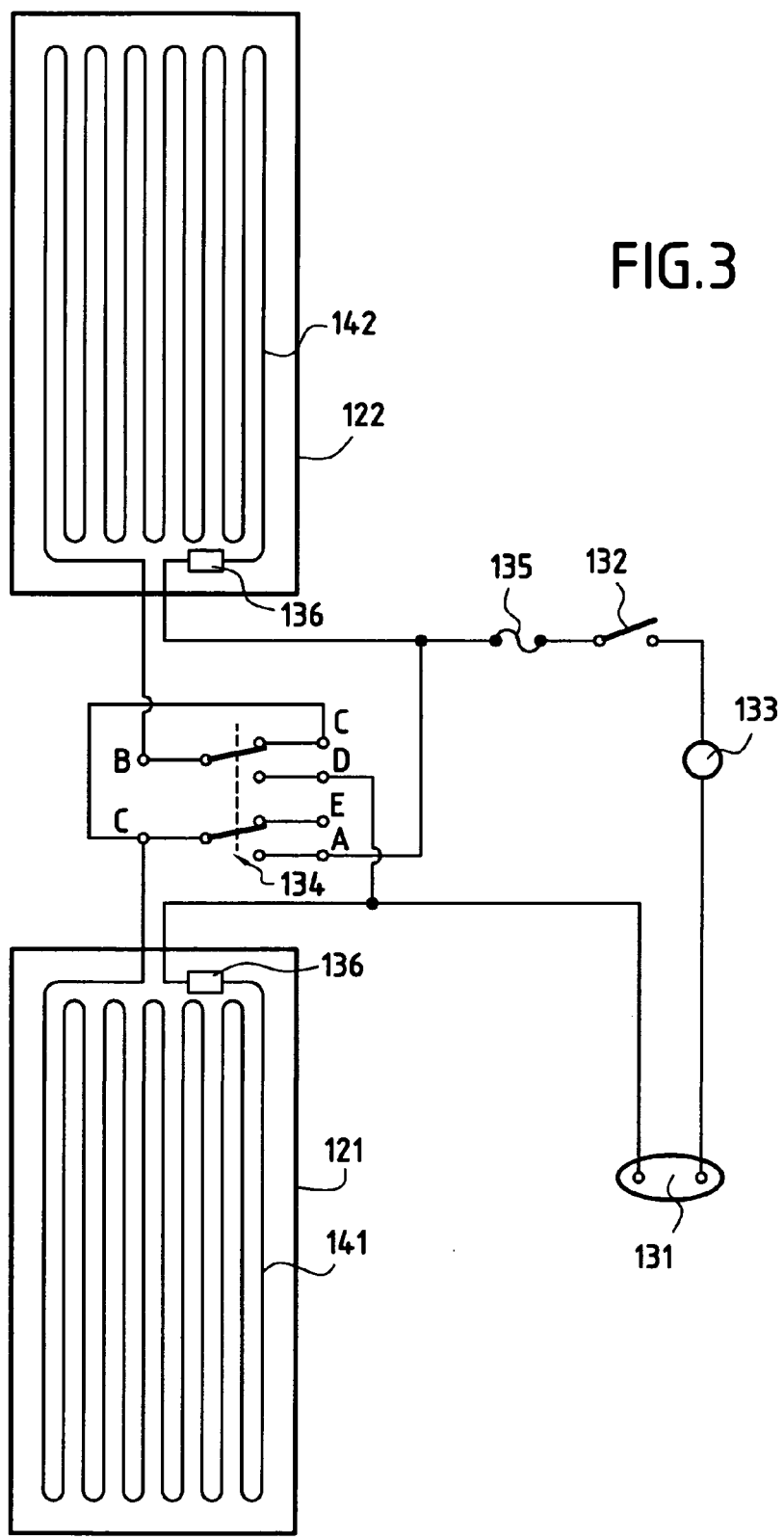
FIG. 3 is a diagram showing the electrical circuit of the first and second electrical heater plates for incorporation in pockets of a heater bag of the invention.
Figure 4:
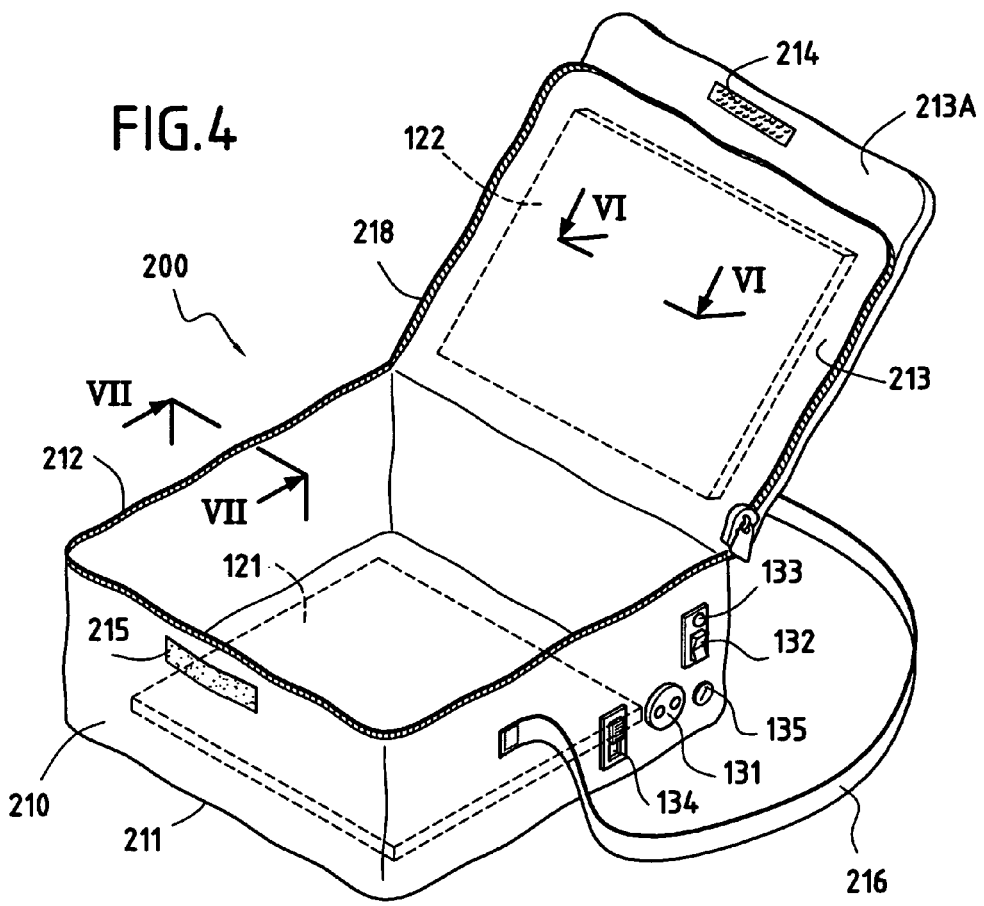
FIG. 4 is an overall perspective view of another embodiment of a heater bag in the form of a case adapted to loaves of small size or to round loaves, flat loaves, or ring-shaped loaves, the case being shown in the open position.
Figure 5:
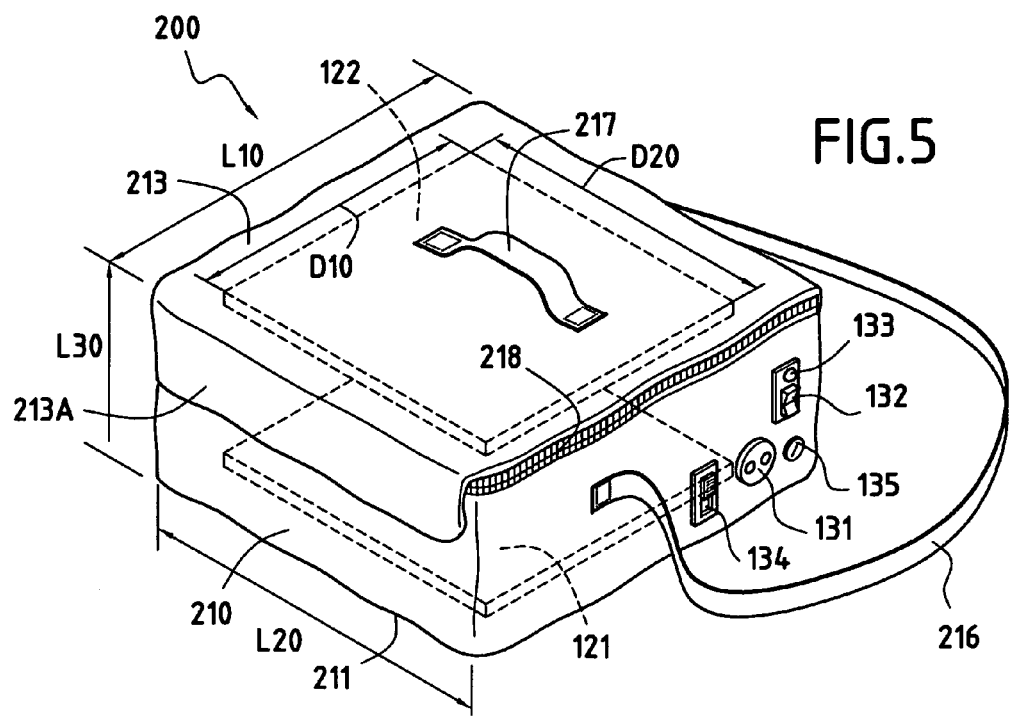
FIG. 5 is a view analogous to FIG. 4, but showing the heater bag in the closed position.

A first embodiment of a heater bag adapted to heating long loaves such as loaves of French bread is described initially with reference to FIGS. 1 to 3, however it should be understood that it can also be used with other bakery products of a variety of shapes and sizes.

It should be observed that the term "bakery products" is used to cover not only loaves made from a fermented dough based on cereal flour, but also loaves of unleavened bread, or indeed Danish pastries and the like.

As examples of leavened or unleavened bread, mention can be made of whole wheat bread, bran bread, rye bread, batch bread, Italian bread, the breads known under the names of pita, motsi, mezonot, halot, lavash, pretzels, matsot, tabouna, or indeed panino.

Pastries may comprise, for example, pains au lait, buns, croissants, or flat cake.

The invention also applies to filled breads or pastries, such as, for example: sandwiches, falafels, shawarmas, raisin or saltana breads, and pains au chocolat, providing the ingredients added to the bread are contained within it and can withstand a temperature of about 40° C. to 42° C.

Preparations such as pies for tarts that include food that is not fully incorporated in the dough are not suitable for being placed in a flexible bag of the kind shown in FIG. 1, but, where appropriate, they could be placed in a bag in the form of a case as described below with reference to FIGS. 4 to 7.

The heater bread bag 100 shown in FIG. 1 comprises a bottom 111, side walls 110, and a top opening 112. A flap 113 can close the top opening 112 for inserting bread. The flap 113 can be held in the closed position by a closure system, e.g. comprising tapes 114 and 115 placed on the flap and on an upper portion of the bag, the tapes 114 and 115 being designed to grip each other via textile fibers. Other types of closure using buttons, press-studs, or zip fasteners are naturally possible. Where appropriate, the closure means may be disposed directly at the rim of the opening 112, in which case the flap 113 can be omitted. A strap 116 fixed to the bag 100 makes it easier to carry.

The bag 100 is made of material that is lightweight, flexible, and capable of withstanding temperatures of about 40° C. to 45° C. The material is preferably a natural material such as cotton, or where appropriate flax or wool, in particular worsted. The bag may also be made of a fabric comprising a mixture of natural fibers, e.g. a mixture of cotton and flax or of cotton and wool.

The dimensions of the bag 100 can vary depending on requirements, but it advantageously presents a height L2 of about 700 millimeters (mm) and a width L1 of about 260 mm, thus making it suitable for bread in the form of long loaves, such as French bread.

The heater bread bag 100 includes at least one, and preferably two semi-flexible electrical heater plates 121 and 122 that are sandwiched inside the front and rear faces of the side walls 114 of the bag.

The side walls of the bag 100 that are to incorporate the heater plates 121 and 122 are thus made in the form of flexible pockets of cotton within which the semi-flexible heater plates 121 and 122 are held captive.

Each semi-flexible heater plate 121, 122 comprises an electrical resistance wire 155 made up of coils 141, 142 organized as a sheet and inserted in sheets of a material such as a silicone glass fabric 154, for example (FIGS. 2 and 3).

Each rectangular heater plate 121, 122 presents dimensions D1 and D2 that are slightly smaller than the width L1 and the height L2 of the front and rear faces of the bag 100.

With the examples given above for the dimensions L1 and L2, a heater plate 121, 122 may present, for example: a width D1=177 mm, and a length D2=620 mm.

The nature of the electric wire 155, its section, the total length of the coils 141, 142, and their spacing, and also the power supply voltage, are selected in such a manner as to deliver heating power per $cm^2$ lying in the range 0.13 W to 0.24 W, and preferably lying in the range 0.16 W to 0.20 W, with a preferred value being 0.18 W.

By selecting such values, bread or other bakery products placed in the bag 100 can be heated quickly in a few minutes (min), about 2 min or 3 min, depending on ambient temperature, thus enabling an optimum warming temperature of about 36° C. to 44° C. to be obtained for the food with a mean value of about 40° C., such that the warmed bread retains all its flavor and is neither too hard nor too dry and does not become stale even on returning to ambient temperature. The particular power densities selected for the heater plates 121 and 122 guarantee that water present in the bread is not completely eliminated, in contrast to toast or bread that has been placed in a microwave oven.

Each flexible cotton pocket for incorporating a heater plate 121, 122 preferably comprises both an outer cotton lining 151 associated with a flannelette 153 placed between the outer cotton lining 151 and the heater plate 121, 122, and secondly an inner cotton lining 156 placed on the inside relative to the heater plate 121, 122 (FIG. 2). These natural materials make it possible to provide a bag that is lightweight and capable of withstanding high temperatures, while concentrating the heat inside the bag, the flannelette 153 or an equivalent fabric providing thermal insulation relative to the outside.

Because the plates 121, 122 are placed parallel to each other in two opposite faces of the side walls 110 of the bag 100, loaves placed inside the bag can be raised in temperature quickly. This happens more quickly if the bag is laid flat on one of its faces containing one of the plates 121, 122, but warming also takes place under satisfactory conditions when the bag is held vertically, e.g. being suspended from its strap 116.

The bag 100 may include bellows 110C between the two main side faces 110A, 110B so as to enable it to adapt to different quantities of bread while ensuring that, when the bag is laid flat, the bread is as close as possible to the walls fitted with the heater plates 121 and 122, because of the ability of the bellows 110C to deform in a direction perpendicular to the main faces 110A, 110B of the bag 100.

The voltage of the power supply for the heater elements 141, 142 of the heater plates 121, 122 preferably lies in the range about 100 V to 240 V. The resistive conductor wires 155 may be made of nickel chromium alloy, for example.

FIG. 3 shows an example of an electrical circuit diagram for powering the heater elements 141, 142 of the plate 121, 122.

A socket 131, e.g. a two-pin socket, serves to receive a power supply cord suitable for connection to an electricity network socket that may present a first nominal voltage $V_{N1}$, e.g. of about 230 V or 220 V, or a second nominal voltage $V_{N2}$, e.g. about 115 V or 110 V, which is half the first nominal voltage $V_{N1}$.

A switch 132, which can be associated with an indicator light 133 optionally incorporated in the switch 132, serves to switch the heater device on and off. A fuse 135 protects the circuit.

A two-voltage switch 134 possessing terminals A to E is connected in such a manner that in a first position of the switch 134 (as shown in FIG. 3), the heater elements 141 and 142 are connected in series from the socket 131, for use when it is powered at the first nominal voltage $V_{N1}$, e.g. of 220 V, while in a second position of the switch 134, it serves to power the heater elements 141 and 142 in parallel from the socket 131, when it is powered with a second nominal voltage $V_{N2}$, e.g. of 110 V. The heater bag 100 can thus be used to provide the same warming conditions both in countries where the power supply network has a voltage of the order of 100 V to 130 V, and in countries where the power supply network has a voltage of about 200 V to 260 V, without it being necessary to fabricate special versions or to use a transformer. The same type of circuit can be used when there is only a single heater plate, but that has a connection midpoint enabling the two halves of the element to be connected in parallel or in series.

Naturally, it is also possible to make an electrical circuit that is adapted to a single type of nominal power supply voltage, with the elements being connected either in series or in parallel and without using the switch 134.

Temperature limiters 136 set to avoid overheating above a predetermined temperature, e.g. 44° C. or 45° C., can be integrated in each of the heater plates 121, 122.

The switch 132 and its light 133 can be located near the top of the elongate bag 100 while the socket 131, the switch 134, and the fuse 135 are located in the bottom portion of the bag, however this disposition is not essential and other arrangements are possible.

Another embodiment of the heater bag 200 in accordance with the invention is described below with reference to FIGS. 4 to 7, this embodiment presenting the shape of a case.

Figure 7:
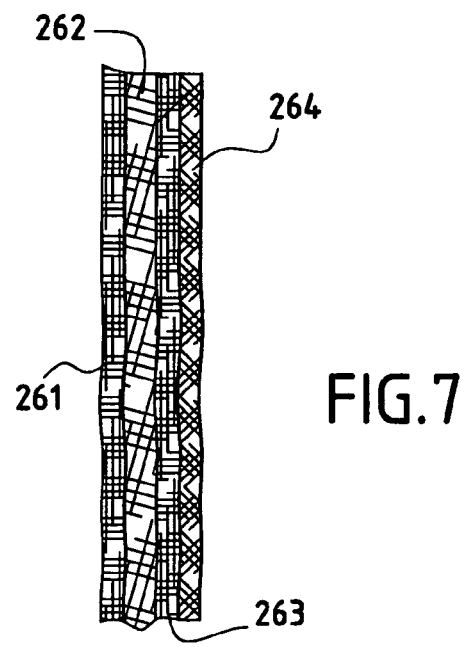
FIG. 7 is a section on line VII-VII of FIG. 4 showing the structure of the side wall of the heater bag in the form of a case.

For the heater bag 200, the bottom wall 211, the side walls 220, and the cover-forming top wall 213 that is for folding down onto the opening 212 can present somewhat greater stiffness than the walls of the elongate bag 100 of FIG. 1, while nevertheless retaining a certain amount of flexibility. A case 200 presenting the same flexibility characteristics as the elongate bag 100 could nevertheless also be made, as a variant. The case 200, like the bag 100, may present side walls 210 made of cotton with a cotton outer lining 261 associated with flannelette 263 and a cotton inner lining 264. A layer of semi-rigid material such as a heat-reactivatable substance 262 used for tieback is preferably interposed, for example, between the outer lining 261 and the flannelette 263 in order to reinforce the side wall 210 and prevent it from sagging excessively (FIG. 7).

Figure 6:
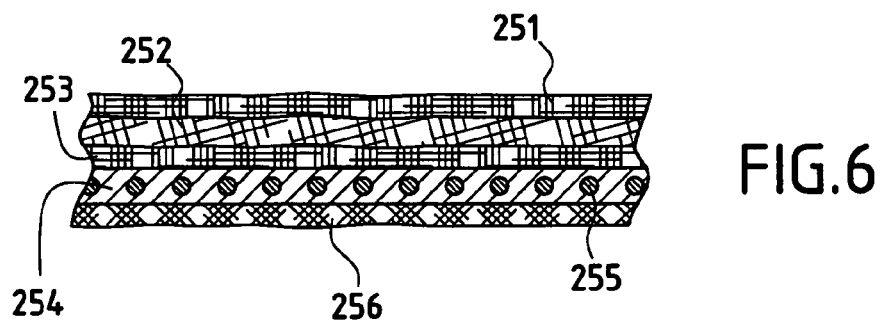
FIG. 6 is a section line on VI-VI of FIG. 4 showing the structure of a portion of the top wall of the bag incorporating a semi-rigid electrical heater plate.

In the same way, the bottom wall 212 and the cover 213 are made in the form of cotton pockets like the walls 110 of the bag 100 in order to incorporate the semi-rigid heater plates 121, 122 and they can likewise be reinforced as shown in FIG. 6.

Thus, an outer cotton lining 251, a reinforcing layer 252 such as a heat-reactivatable substance used for tieback, and a flannelette 253 form an outer wall of the cotton pocket that comes into contact with a heater plate constituted, for example, by sheets of silicone glass fabric 254 incorporating a wire 255 coiled into a sheet and constituting a heater element, while the inside wall of the cotton pocket is constituted by cotton lining 256 (FIG. 6).

With the case 200, the electrical circuit for the heater plates 121, 122 can be analogous to that described with reference to the embodiment of FIG. 1, only the dimensions being different, while the range of heating powers per $cm^2$ remains identical to that mentioned above.

Where appropriate, with a case 200 or with a bag 100, the heater plates 121, 122 and their power supply wires protected in a sheath could be inserted removably in their pockets so as to enable them to be withdrawn temporarily together with the associated components (socket 131, switch 132, light 133, switch 134, fuse 135) so as to make it easier to clean the bag. Under such circumstances, each pocket should include an opening that can be closed in selective manner, e.g. using a zip fastener, in order to enable the heater plate together with its power supply wires to be withdrawn and put back into place.

The case 200 may include a strap 216, a handle 217 for the cover 213, an additional flexible flap 213A that is closed, for example, by means of strips of fabric 214, 215 that grip each other by textile fiber means, and where appropriate a zip fastener 218 or other closure means for holding the cover 213 in the closed position on the rim of the opening 212.

By way of example, the case 200, which is particularly suitable for items of small size or items that are ball-shaped, flat, or ring-shaped, may itself present a depth L10 of 260 mm, a width L20 of 350 mm, and a height L30 of 200 mm to 260 mm.

For a case presenting such dimensions, the heater plates 121, 122 may, for example, present a width D20 of 330 mm and a depth D10 of 177 mm.

Naturally, various other embodiments are possible. Thus, the case 200 of FIGS. 4 and 5 has semi-rigid heater plates 121, 122 disposed parallel in the bottom 211 and the cover 213 of the case, with the socket 131, the switch 132 and its light 133, the switch 134, and the fuse 135 being disposed on a side wall of the case. Nevertheless, it is also possible to place one or more heater plates analogous to the plates 121, 122, either in addition to the plates 121, 122 or replacing them, in one or more side walls 210 of the case 200, insofar as they are likewise made in the form of pockets of flexible natural material such as cotton, e.g. with the structure shown in FIG. 6. The bakery products would then be warmed by the side walls, as in the flexible bag 100, instead of via the bottom and the cover.

Nevertheless, with heater plates 121, 122 placed in the bottom 211 and the cover 213, and with side walls 210 made to be sufficiently flexible, it is possible to guarantee good contact between the heater walls 211, 213 and the products for warming, regardless of the extent to which the bag has been filled, providing the cover 213 always sinks so as to rest on the products, even if they only come halfway up the inside of the case 200, for example, due to the side walls 210 being suitable for deforming in a direction perpendicular to the main faces constituted by the bottom 211 and the cover 213, so as to enable the cover to sink under its own weight down onto the products for warming.

The invention claimed is:

1. A heater bag for bakery products which are made using a flour-based dough, and do not include food not fully incorporated in the dough, the heater bag being configured and operative to warm the bakery products until a temperature between 36° C. and 44° C. starting from a lower ambient temperature while fully conserving the quality and the integrity of these products and simultaneously improving their flavour, the heater bag comprising a flexible or semi-rigid casing defining a bottom, side walls, an opening, and means for selectively closing the opening, wherein the heater bag includes first and second semi-flexible heater plates each having an electrical heater element incorporated therein and said first and second semi-flexible heater plates being inserted in pockets of natural material comprising cotton, flax, and wool, said pockets constituting a portion of the bottom, of the side walls, or of the means for closing the heater bag, wherein, for each said first and second semi-flexible heater plates, the heating power per $cm^2$ lies in the range of 0.16 W to 0.20 W, and wherein each said first and second semi-flexible heater plate comprises an electrical resistance wire integrated in a sheet that is inserted in sheets of silicone glass fabric.

2. A heater bag according to claim 1, wherein the power supply voltage for the heater element of each said first and second semi-flexible heater plates lies in the range of 100 V to 240 V.

3. A heater bag according to claim 1, wherein the first and second semi-flexible heater plates are incorporated in two opposite portions of the side walls.

4. A heater bag according to claim 1, wherein the first and second semi-flexible heater plates are incorporated firstly in the bottom of the heater bag and secondly in the means for selectively closing the opening.

5. A heater bag according to claim 1, wherein each pocket incorporating one of said first and second semi-flexible heater plates comprises firstly an outer cotton lining and a flannelette disposed between the outer cotton lining and said one of said first and second semi-flexible heater plates, and secondly an inner cotton lining placed on the inside relative to said one of said first and second semi-flexible heater plates.

6. A heater bag according to claim 1, wherein the heater bag is elongate in shape and the means for selectively closing the opening are constituted by a simple flexible flap or by closure means disposed in the vicinity of the rim of the opening.

7. A heater bag according to claim 1, wherein the heater bag includes a switch for selectively connecting the heater elements in series for powering from a power supply at a first nominal voltage $V_{N1}$, or in parallel for powering from a power supply at a second nominal voltage $V_{N2}$ equal to half the first nominal voltage $V_{N1}$.

8. A heater bag according to claim 1, wherein the heater bag further comprises a temperature limiter integrated in each said first and second semi-flexible heater plates.

9. A heater bag according to claim 1, wherein said first and second semi-flexible heater plates are disposed in two opposite main faces of the heater bag, and wherein the walls uniting these opposite main faces present a capacity for deformation in a direction perpendicular to said opposite main faces.

10. A heater bag according to claim 1, wherein each said first and second semi-flexible heater plates is removable relative to the pocket in which it is inserted.

\* \* \* \* \*